Patented Feb. 6, 1923.

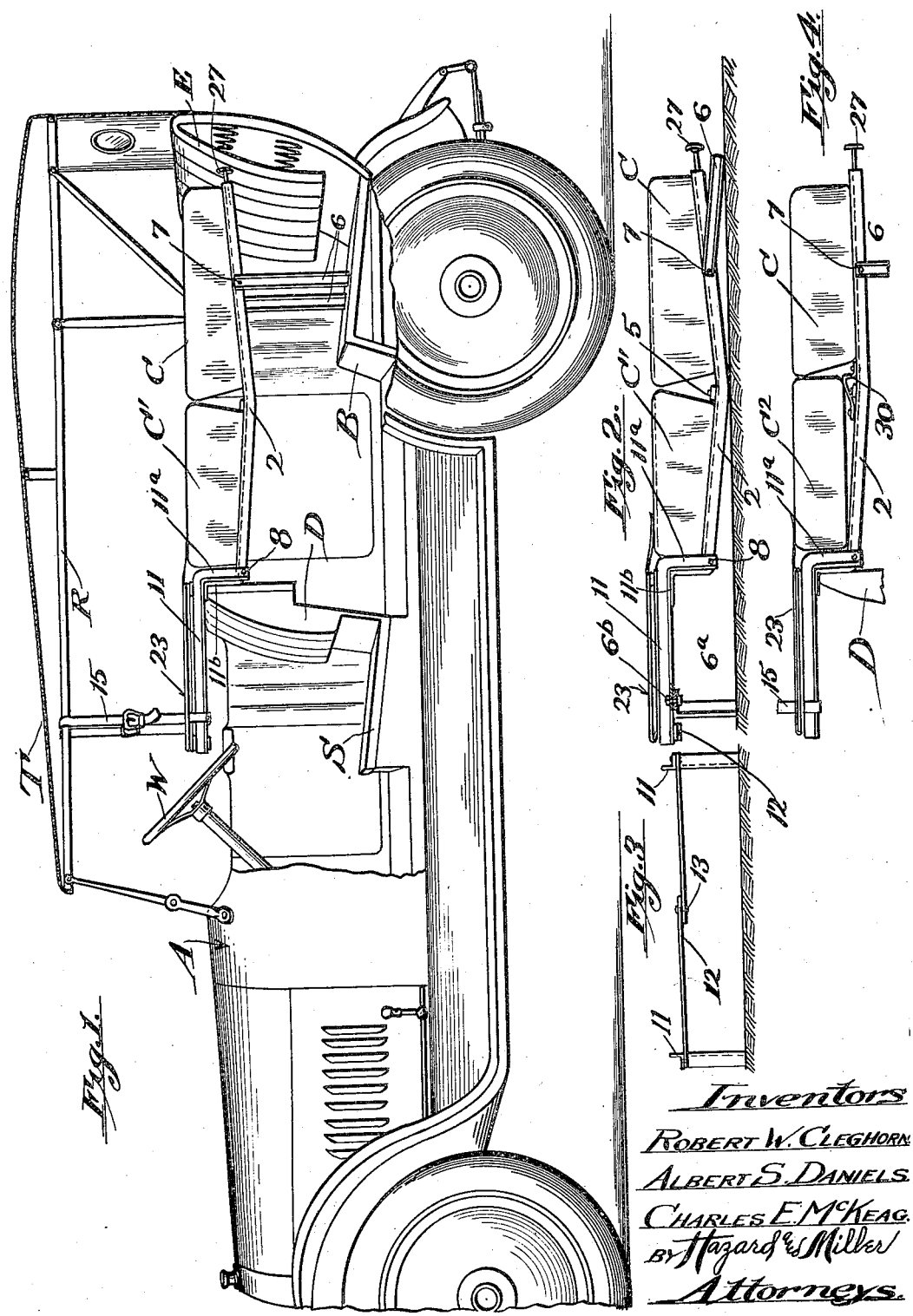

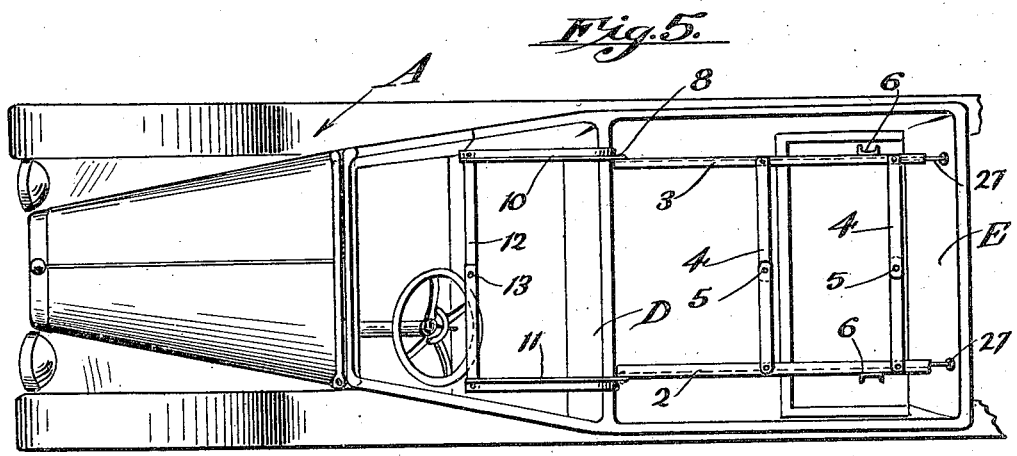
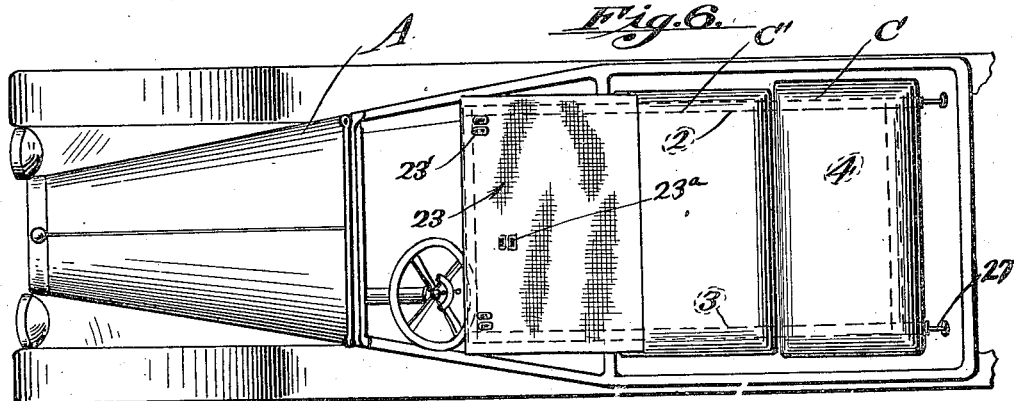
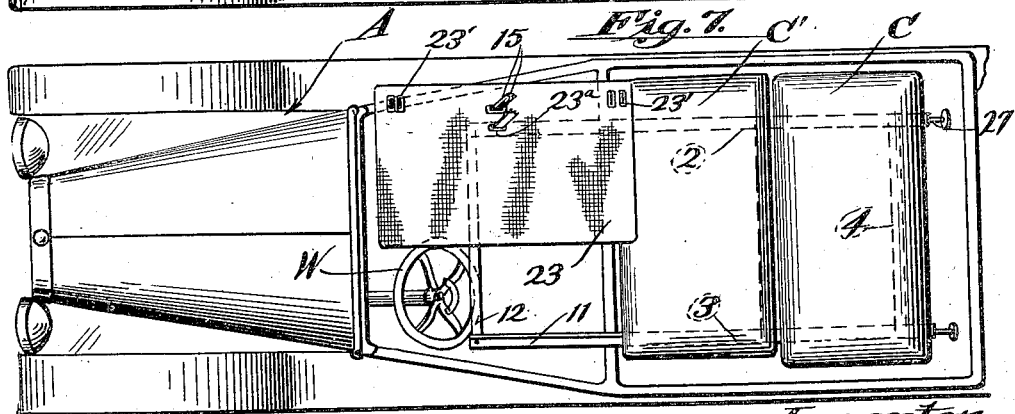
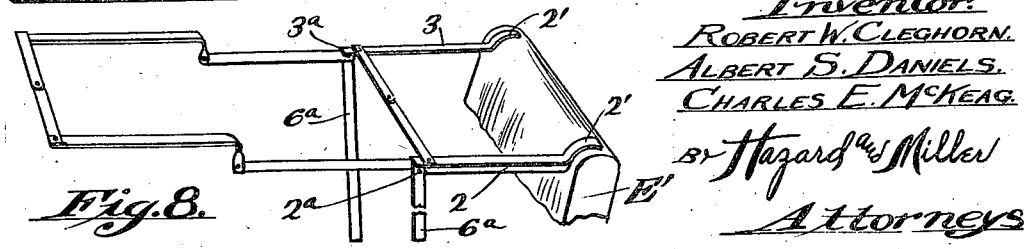

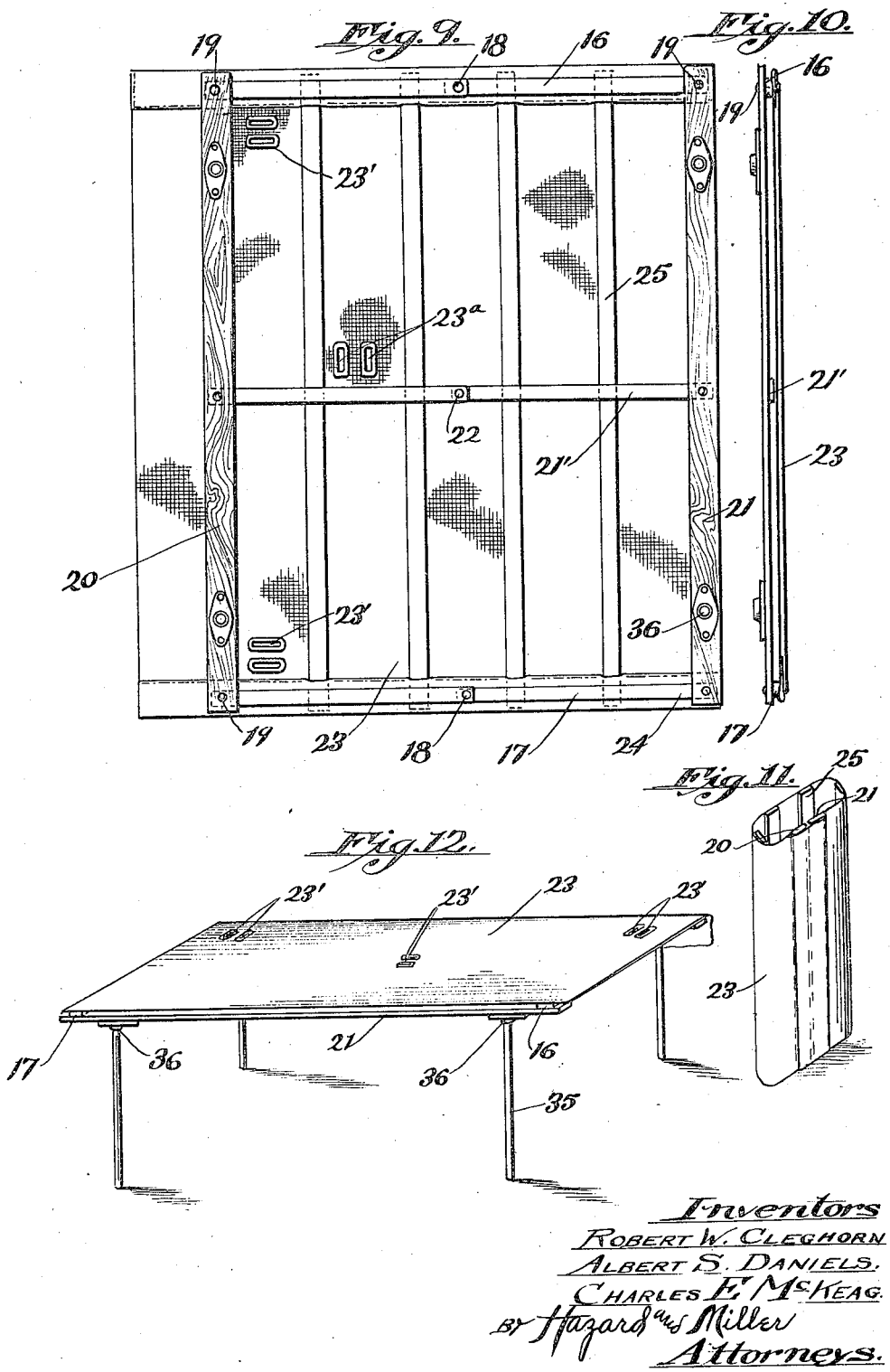

1,444,732

UNITED STATES PATENT OFFICE.

ROBERT W. CLEGHORN, ALBERT L. DANIELS, AND CHARLES E. McKEAG, OF LOS ANGELES, CALIFORNIA.

FOLDABLE AUTOMOBILE BED FRAME.

Application filed June 22, 1922. Serial No. 570,095.

*To all whom it may concern:*

Be it known that we, ROBERT W. CLEG-HORN, ALBERT L. DANIELS, and CHARLES E. McKEAG, citizens of the United States, residing at Los Angeles, in the county of Los Angeles and State of California, have invented new and useful Improvements in Foldable Automobile Bed Frames, of which the following is a specification.
This invention relates to foldable bedframes, and has for its object to provide a bedframe that may be readily folded into a compact collapsed position for transportation and storage, and which also may be readily expanded for adjustment upon the body seat structure of an automobile It is a further object to provide a foldable bedframe for an automobile which enables the utilization of the removable seat cushions of the automobile to form a mattress on the frame. It is also an object to provide a frame that may be readily set up upon any horizontal surface as in a camp, house or tent.
A further object is to provide for the use of the foldable frame in its erected position in such manner that the automobile can be converted into an ambulance in emergency; the extended bedframe with the mattress element supplied thereto forming a support upon which an injured or ill person may recline, and which bedframe while enabling the occupant of the bed to lie at full length across the tops of the seats of the automobile, yet provides ample clearance for the driver of the vehicle.

A further object is to provide a foldable bedframe which with slight modification and change of its elements can be adapted for use with different types of vehicles.

Other objects will be made manifest in the following specification of embodiments of the invention illustrated in the accompanying drawings, in which Figure 1 is a broadside elevation of an automobile partly broken away and showing the extended bedframe as arranged upon the seats thereof.

Fig. 2 shows the extended bedframe as arranged upon a plane surface as the floor of a house or other building, and in which arrangement the automobile seats are applied to form the mattress of the bed.

Fig. 3 is an end view of the foot end of the bed of Fig. 2.

Fig. 4 is a side elevation of the bed extended and showing the provision of supplemental building up brackets.

Fig. 5 is a plan of the tonneau of an automobile showing the extended frame therein.

Fig. 6 is a plan of the tonneau and showing the mattress forming parts applied to the extended frame.

Fig. 7 is a plan of the tonneau and shows the mattress element arranged for ambulance service and as leaving clearance for the driver of the vehicle at the wheel.

Fig. 8 is a perspective of a somewhat modified form adapting the invention to another form of vehicle.

Fig. 9 is a bottom plan of the foot or slat frame of the bed.

Fig. 10 is an end view of the same.

Fig. 11 is a perspective showing the slat frame collapsed and rolled.

Fig. 12 is a perspective illustrating the use of the slat frame as a table.

In its preferred embodiment the invention comprises a frame built up of main side rails 2 and 3 which are preferably formed of channel iron with inturned top flanges in a common plane, and these are transversely connected by foldable links 4 having medial joints 5 which can be folded and permit the bringing of the side rails 2 and 3 into close parallel position so that the frame can be compactly collapsed to be stored away.

Adjacent the rear or head end of the frame members 2—3 is provided a set of legs 6 which are pivotally connected as at 7 so as to be folded up along the side of the rails, and which legs form supporting means.

Pivoted at 8 upon the forward and outside ends of the rails 2—3 are side forming members 10 and 11 also preferably of angle iron with flanges turned outwardly and also having flanges laid flat against the side flanges of the rails 2—3. The outer ends of the head members 10 and 11 are transversely connected by a foldable brace 12 having a medial pivotal connection 13 which, when buckled, enables the side members 10 and 11 to be brought toward each other in folded position.

The frame as thus constructed when extended is designed to be arranged within the tonneau of an automobile A in which position the legs 6 are swung downwardly to be deposited upon the rear bench B in the tonneau after the cushion C has been removed.

The front arms or end members 10 and 11 of the bedframe are shown as L-shaped, and the short arm portion as 11ª is designed to extend vertically down behind the back D of the front seat so that the forwardly extending longer portions of the members 10 and 11 project forwardly over the top D of the front seat. The length of the L legs 11ª is substantially equal to the thickness of the cushion C of the back seat and the cushion C' of the front seat, so that the cushions when applied to the frame members 2—3 will assume a level substantially equal to that of the forwardly extending front end members of the bed bearing upon the back of the front seat.

It is understood that the dimensions of the frame will be made according to the tonneau dimensions of any particular automobile with which the bed is to be used, and the side members of the bed frame are preferably arranged when erected within the side panels of the body of the automobile. To support the overhanging end of the front frame above the front seat S, straps or other suspending devices 15 are provided and may be attached to the side rails R of the top T of the automobile, and these will, therefore, when passed around the side members 10 and 11, provide for the safe and substantial support thereof and of the person reclining upon the bed.

To form a mattress carrying means for the foot frame 10—11, there is provided a foldable bedding support consisting of side bars 16 and 17 pivotally connected at adjacent ends as at 18, and to the extremities of the bars 16 and 17 are pivoted at 19 transverse end members 20 and 21, and these are mediately braced by a foldable link or brace device 21 having a pivotal connection 22 in the line of the pivots 18 of the side members 16 and 17. By folding the brace members 16, 17 and 21 on their pivots 18 and 22, the end members 20 and 21 can be moved into close parallel relation as shown in Fig. 11.

The bottom of the bedding support is clearly shown in Fig. 9, and upon its upper portion there is applied a flexible sheet 23 of any suitable material and this may have along parallel edges hems 24 into which may be tucked the ends of transversely extending flexible slats 25. From this it will be seen that the extended bedding support may be positioned upon the front or end frame members 10—11, and any suitable bedding as blankets or a mattress may be then extended from end to end of the bedframe over the cushions C and C' when these have been applied upon the depressed side members 2 and 3 of the frame.

The mattress or bedding support 23 may be perforated as at 23' to provide for the passage of the suspending straps 15, Fig. 1, through the sheet of the support and to and around the end members 10 and 11.

In some types of automobiles the rear ends of the side members 2—3 of the frame may occupy a position just in front of the back cushions E, and in such case the ends of the depressed frame may be provided with suitable bumpers 27 to protect the cushion.

When it is desired to utilize the foldable bedframe as a cot or temporary bed support upon the ground or upon the floor of a room, then the side legs 6 may be swung out of the way as shown in Fig. 2, to permit the side members 2 and 3 to rest immediately upon the floor or ground and auxiliary supporting legs 6ª are then attached as by bolts 6ᵇ or otherwise to the front elevated or foot frame members 10—11, Fig. 2, so as to support the elevated foot part of the frame.

In some cases the cushions C of the automobile may be considerably compressed or worn, and in order to properly build up the level of such cushions when they are utilized in the bed structure, jack or prop means are attached to the side frames 2 and 3. Such means may consist of simple upwardly projecting knee-like pieces 30 which are attached to the top flanges of the side rails and will therefore serve to elevate the applied flattened cushion as C².

A modified form of the frame is shown in Fig. 8 in which the rear ends of the side members 2 and 3 are curved as at 2' to fit over the upper portion of the back seat cushion E' of an automobile, and in this case the side members 2 and 3 are formed of jointed sections pivotally connected as at 2ª and 3ª, the legs 6ª extending to the floor of the car.

In the event that it should be desired to use the apparatus for ambulance purposes, then it is only necessary to swing the bedding support 23 around to the position shown in Fig. 7, in which case it extends forwardly to one side of the steering wheel W and leaves exposed the uncovered part of the support frame 11 and 12 which is adjacent the steering wheel. This enables the reclining of an injured or ill person upon the extended bedding and also provides sufficient room for the driver to have access to the steering wheel and operating levers. When the bedframe is erected to extend forwardly, the bedding sheet 23 is provided with strap holes 23ª to receive one of the supporting straps 15.

In the event that it is desired to utilize the bedding support 23 as a table, this may be accomplished by the attachment of legs 35 to socket members 36 shown in Fig. 9 as applied to the underneath surface of the front and rear transverse members 20 and 21 of the bedding frame.

The frame section herein referred to as the front section may be considered as the foot section when the bed is in use, since then the body of the person reclining on the bed would be supported comfortably upon the comparatively deep cushions C—C' and thus only the lower limbs and feet would rest upon the shallower bedding on the front or foot section overhanging the front seat.
To protect the top of the front seat from injury, suitable padding or protecting means, as pad strips 11$^b$, may be applied in the angle of the L-shaped side members 10 and 11 of the front frame section.
Various modifications and changes may be resorted to within the spirit of the invention as claimed.

What is claimed is:

1. A foldable bedframe comprising a section having downturned rear ends, means for supporting the said frame horizontally, and a cushion receiving frame attached foldably to the said ends and having downwardly bent side bars, the rear frame hav- ing means for jacking up a flattened cushion resting on the bent part of the bars.

2. A foldable bedframe comprising a section having downturned rear ends, and a cushion receiving frame attached foldably to the said ends and having downwardly bowed rails to hold cushions of uneven shape with their tops in one plane.

3. A foldable bedframe comprising a front section having downturned rear ends, means for supporting the said frame horizontally, a cushion receiving frame attached foldably to the said ends and having foldable legs, and a foldable bedding receiving device for the front section, and which device is adapted to be arranged on said section so as to lie to one side of the usual steering wheel and permit of ambulance service.

In testimony whereof we have signed our names to this specification.

ROBERT W. CLEGHORN.
ALBERT L. DANIELS.
CHARLES E. McKEAG.